(12) United States Patent
Naeimi et al.

(10) Patent No.: US 10,467,137 B2
(45) Date of Patent: Nov. 5, 2019

(54) APPARATUS, SYSTEM, INTEGRATED CIRCUIT DIE, AND METHOD TO DETERMINE WHEN TO BYPASS A SECOND LEVEL CACHE WHEN EVICTING MODIFIED DATA FROM A FIRST LEVEL CACHE

(71) Applicant: INTEL CORPORATION, Santa Clara, CA (US)

(72) Inventors: Helia Naeimi, Santa Clara, CA (US); Qi Zeng, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 213 days.

(21) Appl. No.: 15/717,934

(22) Filed: Sep. 27, 2017

(65) Prior Publication Data

US 2019/0095328 A1   Mar. 28, 2019

(51) Int. Cl.
| | | |
|---|---|---|
| G06F 12/00 | (2006.01) | |
| G06F 12/0811 | (2016.01) | |
| G06F 12/128 | (2016.01) | |
| G06F 12/0888 | (2016.01) | |
| G06F 12/084 | (2016.01) | |

(52) U.S. Cl.
CPC ........ *G06F 12/0811* (2013.01); *G06F 12/084* (2013.01); *G06F 12/0888* (2013.01); *G06F 12/128* (2013.01); *G06F 2212/1016* (2013.01); *G06F 2212/283* (2013.01); *G06F 2212/621* (2013.01)

(58) Field of Classification Search
CPC . G06F 12/0811; G06F 12/0888; G06F 12/128
See application file for complete search history.

(56) References Cited

PUBLICATIONS

Chi, P., et al., "Architecture Design with STT-RAM: Opportunities and Challenges", © 2016 IEEE, 6 pp.
Khan, S., et al., "Improving Cache Performance by Exploiting Read-Write Disparity", Feb. 2014, 12 pp.
Kultursay, E., et al., "Evaluating STT-RAM as an Energy-Efficient Main Memory Alternative", Apr. 2013, 12 pp.
Lempel, O., "2nd Generation Intel Core Processor Family: Intel Core i7, i5 and i3", Aug. 2011, 48 pp.
Wikipedia, "CPU Cache", [online] last edited Jun. 18, 2017, [retrieved on Jul. 17, 2017], Retrieved from the Internet at <URL: https://en.wikipedia.org/wiki/CPU_cache>, 13 pp.

(Continued)

*Primary Examiner* — Gurtej Bansal
(74) *Attorney, Agent, or Firm* — Konrad Raynes Davda & Victor LLP; David W. Victor (57) ABSTRACT

Provided are an apparatus, system, integrated circuit die, and method for caching data in a hierarchy of caches. A first cache line in a first level cache having modified data for an address is processed. Each cache line of cache lines in the first level cache store data for one of a plurality of addresses stored in multiple cache lines of a second level cache. A second cache line in the second level cache is selected and a determination is made of a number of corresponding bits in the first cache line and the second cache line that are different. Bits in the first cache line that are different from the corresponding bits in the second cache line are written to the corresponding bits in the second cache line in response to a determination that the number of corresponding bits that are different is less than a threshold.

25 Claims, 3 Drawing Sheets

(56) References Cited

PUBLICATIONS

Wikipedia, "Memory Management Unit", [online] last edited Jun. 8, 2017, [retrieved on Jul. 17, 2017], Retrieved from the Internet at <URL: https://en.wikipedia.org/wiki/Memory_management_unit>, 5 pp.

United States Patent Application, entitled "Apparatus, System, and Method to Determine a Cache Line in a First Memory Device to Be Evicted for an Incoming Cache Line From a Second Memory Device", filed Sep. 27, 2017, 28 pp. [77.401 (Appln)].

Notice of Allowance 1 for U.S. Appl. No. 15/717,933, dated May 15, 2019, 12 pp. [77.401 (NOA1)].

APPARATUS, SYSTEM, INTEGRATED CIRCUIT DIE, AND METHOD TO DETERMINE WHEN TO BYPASS A SECOND LEVEL CACHE WHEN EVICTING MODIFIED DATA FROM A FIRST LEVEL CACHE

TECHNICAL FIELD

Embodiments described herein generally relate to a non-volatile memory device.

BACKGROUND

In a hierarchical cache management system, a modified cache line in an on-chip cache, such as an L2 cache, may be written to an intermediary memory device, such as a last level cache, when evicted from the L2 cache, before being written to the main memory. If a write back is performed to a spin-transfer torque magnetic random-access memory (STT-RAM) operating as the intermediary memory device, to minimize the number of bits written, a partial write may be performed where only the dirty bits in the cache line are written to the STT-RAM memory, which reduces energy needed for the write by writing fewer bits in a manner that has no effect on the performance of the write.

Further, when the L2 cache has new data and the last level cache and main memory have older data, then when evicting data in the L2 cache, the last level cache may be bypassed and the new data from the L2 cache may be written directly to the main memory. An alternative technique is to write the new data from the L2 cache to the last level cache.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Certain types of memory devices, such as an Spin Torque Transfer-Random Access Memory (STT-RAM) memory device, consume significant amounts of energy for writes and experience write latency. However, such memory devices may have advantages of low power consumption and low latency for reads and may be suitable for being deployed as an intermediary cache, such as a last level cache, between on-chip caches (e.g., L1 and L2) on the processor cores and the main memory.

Described embodiments provide techniques to improve system endurance by limiting writes to an intermediary cache, such as a last level cache, comprised of a memory device that consumes significant amounts of energy for a write. With described embodiments, when writing modified data from a higher first level cache to a second level cache intermediary cache, such as a last level cache before the main memory, a determination is made of a number of corresponding bits in a first cache line in the first level cache having modified data for an address that differ from the bits in a second cache line in the second level cache having outdated data for the address. Corresponding bits in the first cache line and the address comprise bits at same bit locations or positions in the first cache line and at the address. The bits in the first cache line that are different from the corresponding bits in the second cache line are written to the corresponding bits in the second cache line in response to a determination that the number of corresponding bits that are different is less than a threshold. If the number of different bits is greater than the threshold, then the modified data in the first cache line is written to a third cache line in a third level cache, such as a main memory, bypassing the intermediary second level cache.

Using the threshold of the different number of bits limits the number of writes that will occur for a write back of a cache line from the first level cache to the second level cache to conserve power consumption and write latency at the second level cache. If the threshold is exceeded, indicating that a partial write of the different bits may consume a relatively high amount of energy, then a write bypass is performed to write the modified cache line directly to the third level cache, e.g., main memory, and bypass the second level cache, such as a last level cache. However, if the number of different bits does not exceed the threshold, then writing only the bits that differ will not consume too much energy, because the number of bits being written are less than a threshold and within the write/switching budget.

With described embodiments, performing the bypass to write the modified data in the first cache line to the main memory conserves energy and wear on the second level cache, and will also likely not have a negative impact on cache read hits in the last level cache because reads are less likely to be directed to modified data than unmodified data. Thus, a cache demotion policy that bypasses the second (last) level cache to limit the number of bit writes to the cache line in the second level cache will have minimal performance impact on the cache read hit rate at the second level cache while providing reductions in write power consumption and write latency. Further, limiting writes to the second level cache to bits within the threshold number maintains write power consumption within a constrained level. The described embodiments are thus beneficial for non-volatile memory devices, such as STT-RAMs, that have a significant difference in the amount of energy consumed for writes versus reads.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
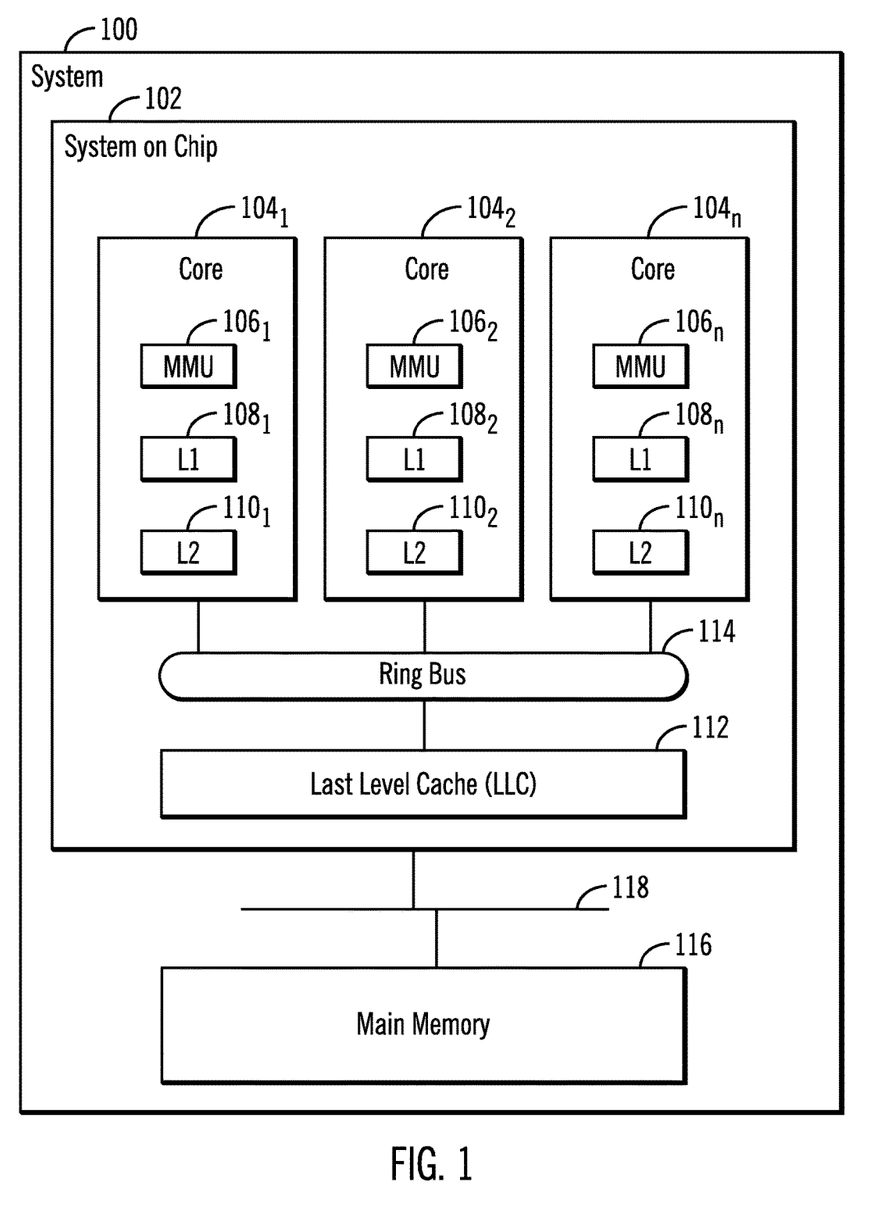
FIG. 1 illustrates distributions of a system in which embodiments are implemented.

FIG. 1 illustrates an embodiment of a system 100 including a system-on-a-chi 102 having a plurality of processing cores $104_1$, $104_2$ ... $104_n$, each having a memory management unit (MMU) $106_1$, $106_2$ ... $106_n$, an on-chip L1 cache $108_1$, $108_2$ ... $108_n$ and on-chip L2 cache $110_1$, $110_2$ ... $110_n$ that are private to the processing cores $104_1$, $104_2$ ... $104_n$. The processing cores $104_1$, $104_2$ ... $104_n$ may write back modified cache lines from the L2 cache $110_1$, $110_2$ ... $110_n$ to a shared last level cache (LLC) 112 to make room for a cache line evicted from the L1 cache $108_1$, $108_2$ ... $108_n$. When modified data needs to be removed from the L2 cache $110_1$, $110_2$ ... $110_n$ to make room for modified data from the L1 cache $108_1$, $108_2$ ... $108_n$, a write back operation is performed to write the data to the last level cache 112 over a ring bus 114. When modified data needs to be removed from the last level cache 112 to make room for new modified data from the L2 cache $110_1$, $110_2$ ... $110_n$, it is written to the main memory 116 over a bus 118, such as a memory bus or Peripheral Component Interconnect Express (PCIe) bus. In this way the L1 cache $108_1$, $108_2$ ... $108_n$ and L2 cache $110_1$, $110_2$ ... $110_n$, last level cache 112, and main memory 116 provide a hierarchy of caches.

The processing cores $104_1$, $104_2$ ... $104_n$ may each include additional components such as a system agent, bus interface controllers, graphics, translation lookaside buffer (TLB), etc. Further, there may only be one cache on the processing core $104_i$. Further, there may only be one cache on a processing core $104_i$, where a processing core $104i$ comprises any one of the processing core $104_i$ cores $104_1$, $104_2$ ... $104_n$.

The memory management units $106_1$, $106_2$ ... $106_n$ may be implemented in the integrated circuit die forming the processing core $104_1$, $104_2$ ... $104_n$. Alternatively, the memory management unit may be implemented in an Application Specific Integrated Circuit (ASIC) separate from the cores $104_1$, $104_2$ ... $104_n$. Still further, the memory management units may be implemented as software in a computer storage medium that is loaded from memory and executed by the processing cores $104_1$, $104_2$ ... $104_n$.

In FIG. 1, the last level cache 112 is shown in the system-on-a-chip 102. In alternative embodiments, the last level cache 112 may be on the system 100 motherboard external to the system-on-a-chip 112.

The L1 cache $108_1$, $108_2$ ... $108_n$ and L2 cache $110_1$, $110_2$ ... $110_n$ may be small and private to each processing core $104_1$, $104_2$ ... $104_n$, such as on the chip of the processing core $104_i$. The last level cache 112 may have more capacity than the L1 and L2 caches. The last level cache 112 may be organized as an associative cache, where each memory address would map to a set of address in the last level cache 112. When all the lines in a set are used in the last level cache 112, then the memory management unit $106_i$ of a processing core $104_i$ needing to move the data from its L2 cache $110_i$ uses a replacement policy to decide on the cache line in the set to evict to make room for modified data from the L2 cache $110_i$. L2 cache $110_i$ comprises any one of the L2 cache $110_1$, $110_2$ ... $110_n$. In certain embodiments, the last level cache 112 may be divided into slices, one slice for each processing core $104_1$, $104_2$ ... $104_n$, where each slice stores data for a specific core.

In one embodiment, the L1 cache $108_1$, $108_2$ ... $108_n$ and L2 cache $110_1$, $110_2$ ... $110_n$ are implemented on the processing cores $104_1$, $104_2$ ... $104_n$. The last level cache (LLC) may comprise a non-volatile memory device, such as a spin-transfer torque magnetic random-access memory (STT-RAM), which has the characteristic of high read performance and low read energy consumption, but has a higher write energy and longer write latency. The main memory 116 may comprise the main system memory, such as comprised of Dynamic Random Access Memory (DRAM), etc. Other non-volatile memory devices may be used for the last level cache 112 and main memory 116 including, but not limited to, a three dimensional crosspoint (3D crosspoint) memory device, or other byte addressable write-in-place nonvolatile memory devices. In some embodiments, 3D crosspoint memory may comprise a transistor-less stackable cross point architecture in which memory cells sit at the intersection of word lines and bit lines and are individually addressable and in which bit storage is based on a change in bulk resistance.

The first level cache and second level cache may also include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory, or storage, such as magnetic storage medium, etc. hard disk drives, tape, etc. The memory device may refer to the die itself and/or to a packaged memory product.

FIG. 1 shows a multi-core implementation. In an alternative embodiment, the last level cache 112 may be provided for just a single core processor having an L1 and L2 cache. The number of cores may comprise any number of one or more cores implemented on the system-on-a-chip 102. The system-on-a-chip 102 may comprise an Intel® Core® microarchitecture or multi-core processor microarchitecture from other vendors and manufacturers. (Intel and Core are trademarks of Intel Corporation throughout the world).

FIG. 1 shows a hierarchical cache system where a highest level cache, or first level cache, comprises an on-chip cache, such as an L2 cache, where a second level cache, or intermediary cache, comprises a last level cache 112, and where a third or lowest level cache comprises a main memory 116. In a further embodiment, the first level cache may comprise the L1 cache $108_1$, $108_2$ ... $108_n$ and the second level cache may comprise the L2 cache $110_1$, $110_2$ ... $110_n$. In alternative embodiments, the first, second, and third level caches in a cache hierarchy may be implemented in systems different than shown in FIG. 1 and comprise different types of cache devices than shown in FIG. 1, including cache devices on the processor core and/or external to the processor core.

In described embodiments, the third level cache has a largest number of cache lines or addresses and multiple addresses in the third level cache map to one cache line in the first and second level caches. Further, multiple addresses or cache lines in the second level cache may map to a single cache line in the first level cache. In this way, there may be cache conflicts, because a cache line in the first level cache may have data from one of multiple cache lines in the second level cache and multiple addresses in the third level cache. Modified data in a cache line in the first level cache may have to be evicted to the second level cache to make room for data for another address that maps to that same cache line.

The cores $104_1, 104_2 \ldots 104_n$ may each include a memory management unit (MMU) $106_1, 106_2 \ldots 106_n$. The memory management units $106_1, 106_2 \ldots 106_n$ may include Input/Output circuitry and hardware logic to perform the replacement and eviction related operations of FIG. 2.

Figure 2:
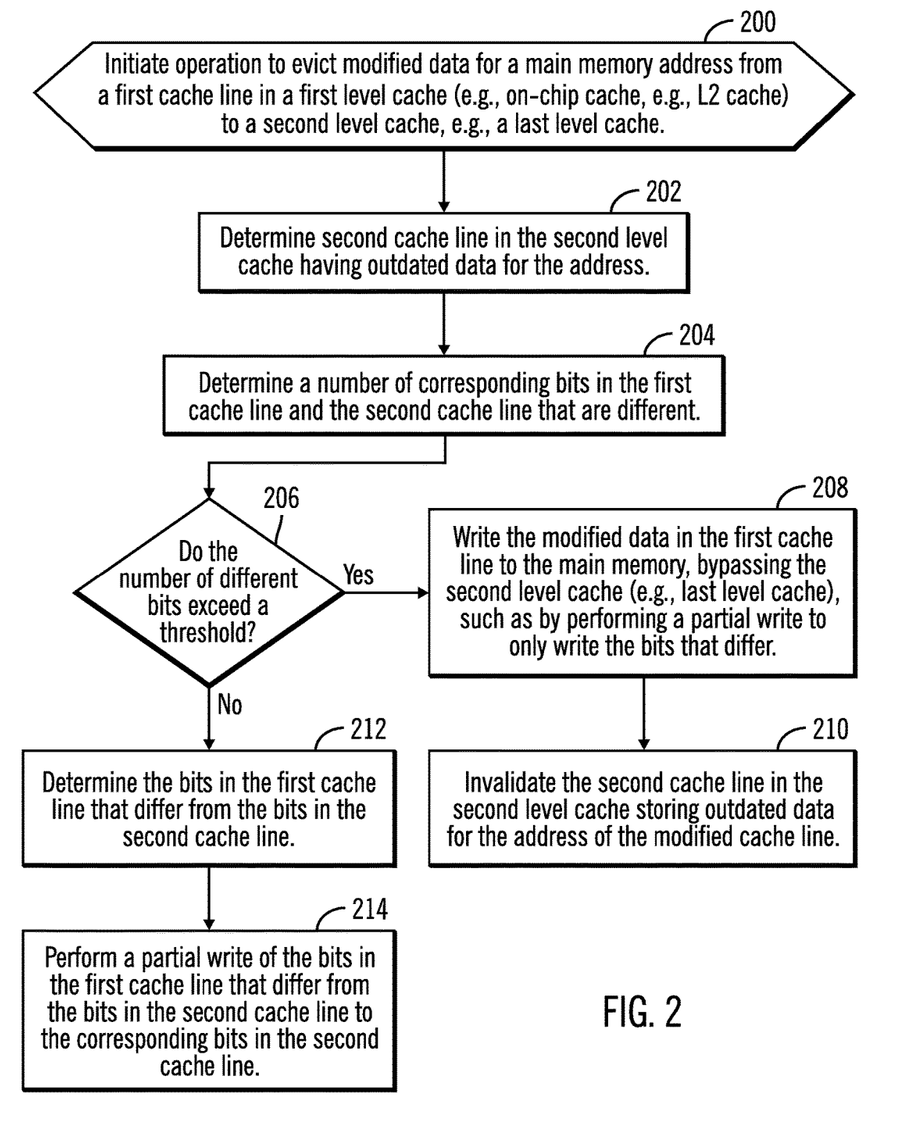
FIG. 2 illustrates an embodiment of operations to determine whether to bypass a second level cache when evicting modified data from a first level cache.

FIG. 2 illustrates an embodiment of operations performed by a memory management unit $106_i$ in a core $104_1$ to evict modified data from a cache line in a first level cache, such as the L2 cache $110_1$, to make room for new data to be added to the first level cache $110_i$. The modified data in a cache line in the first level cache is evicted to make room for data for another memory address, and the evicted cache line is written back to the second level cache 112. Upon initiating (at block 200) an operation to evict modified data in a first cache line in the first level cache e.g., L2 cache $110_i$, for a memory address in a third level cache (e.g., main memory 116), a determination is made (at block 202) of a second cache line in the second level cache, e.g., last level cache 112, having outdated data for the address of the modified data. The cache line having the outdated data in the second level cache 112 is considered as the candidate to store the data being evicted from the first level cache $110_i$ because the outdated version of this data in the second cache line is likely to be most similar to the modified data for the address in the first cache line, and thus the cache line in the second level cache 112 most likely to require the fewest number of writes to be changed to the modified data in the first level cache being evicted. The memory management unit $106_i$ determines (at block 204) a number of corresponding bits in the first cache line in the first level cache $106_i$, and the second cache line in the second level cache 112 having the outdated data for the address that are different. Corresponding bits in the first cache line and the address comprise bits at same bit locations or positions in the first cache line and at the address. In one embodiment, an XOR operation may be performed on the bits in both the first and second cache lines to produce a difference bit for each bit in the cache lines indicating whether each bit of the compared first and second cache lines is different or same.

If (at block 206) the number of different bits between the first and second cache lines does not exceed a threshold, then the memory management unit $106_i$ writes (at block 208) the modified data in the first cache line to the third level cache, e.g., main memory 116, bypassing the second level cache 112. The bypassed second cache line in the second level cache 112 storing outdated data for the address of the modified cache line is invalidated (at block 210). The threshold is used to avoid writing the evicted modified data to the second level cache 112 to limit the energy expended when the number of writes exceeds a threshold.

If (at block 206) the number of different bits does not exceed the threshold, then the memory management unit $106_i$ determines (at block 212) the bits in the first cache line that differ from the bits in the second cache line, and then performs (at block 214) a partial write of the bits in the first cache line that differ from the bits in the second cache line to the corresponding bits in the second cache line. The partial write only writes the bits in the modified cache line that differ from the bits in the target cache line in the second level cache 112. In this way the write operation is optimized and write energy consumption minimized, because the partial write of the described embodiments minimizes the number of bit writes to write a cache line by only writing those bits that differ between the modified and selected cache line.

The threshold number of bits that differ between the modified data and outdated data may be empirically determined to provide a minimal number of bits to minimize the amount of power expended for the partial write but that is not so low as to result in an unacceptable negative impact on cache read hits in the last level cache 112, i.e., increase the cache read miss rate. The lower the threshold number, which minimizes power required for the write and write latency, the more times modified data being evicted from the first level cache $110_i$ will bypass the second level cache 112, which increases the potential number of cache read misses to the second level cache 112. Thus, the threshold number is selected to minimize the threshold to a level that will not have an unacceptable impact on the cache read miss rate in the second level cache 112. The negative impact on cache read hits to the second level cache when the bypass occurs is also limited because the bypass is occurring for modified data and a read is significantly less likely to be directed to modified data than unmodified data.

In further embodiments for FIG. 2, the first level cache may comprise the L1 cache $108_1, 108_2 \ldots 108_n$, the second level cache may comprise the L2 cache $110_1, 110_2 \ldots 110_n$, and the third level cache may comprise the last level cache 112 or main memory 116. In yet alternative embodiments, the first, second, and third level caches in a cache hierarchy may be implemented in systems different than shown in FIG. 1 and comprise different types of cache devices than shown in FIG. 1.

Figure 3:
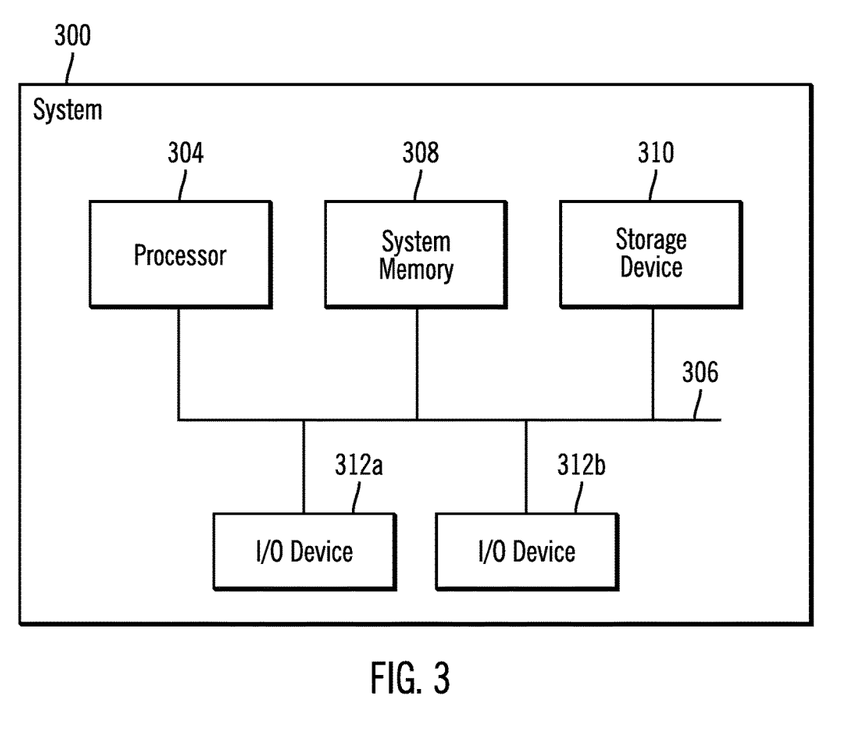
FIG. 3 illustrates a system in which the components of FIG. 1 may be deployed.

FIG. 3 illustrates an embodiment of a system 300 in which the system on a chip 102 of FIG. 1 may be deployed as the processor 304 and the main memory 116 may comprise the system memory 308. The system 300 may further include a storage device 310 for long-term storage. The processor 304 may communicate over a bus 306 with the system memory 308, in which programs, operands and parameters being executed are cached, and the non-volatile storage device 310. The processor 304 may also communicate with Input/Output (I/O) devices 312a, 312b, which may comprise input devices, display devices, graphics cards, ports, network interfaces, etc.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment.

Thus, the claims following the detailed description are hereby expressly incorporated into this detailed description.

EXAMPLES

Example 1 is an apparatus for caching data in a first level cache and a second level cache in a hierarchy of caches, comprising: a memory management unit to: process a first cache line in the first level cache having modified data for an address, wherein each cache line of cache lines in the first level cache stores data for one of a plurality of addresses stored in multiple cache lines of the second level cache; select a second cache line in the second level cache; determine a number of corresponding bits in the first cache line and the second cache line that are different; and write bits in the first cache line that are different from the corresponding bits in the second cache line to the corresponding bits in the second cache line in response to a determination that the number of corresponding bits that are different is less than a threshold.

In Example 2, the subject matter of claims 1 and 3-9 can optionally include that to write the bits that are different is to perform a partial write operation to only write bits in the first cache line that differ from the corresponding bits in the second cache line.

In Example 3, the subject matter of claims 1, 2 and 4-9 can optionally include that to select the second cache line is to determine a cache line in the second level cache having outdated data for the address of the modified data.

In Example 4, the subject matter of claims 1-3 and 5-9 can optionally include that the first cache line in the first level cache is processed to evict data for the first cache line from the first level cache in order to use the first cache line to store data for another address.

In Example 5, the subject matter of claims 1-4 and 6-9 can optionally include that to determine the number of corresponding bits in the first and the second cache lines that differ is to perform an XOR operation of the corresponding bits in the first and second cache lines.

In Example 6, the subject matter of claims 1-5 and 7-9 can optionally include that each cache line of cache lines in the second level cache stores data for one of a plurality of addresses stored in multiple cache lines of a third level cache, wherein the memory management unit is further to: write the modified data for the address in the first cache line to a third cache line in the third level cache in response to a determination that the number of corresponding bits that are different between the first cache line in the first level cache and the second cache line in the second level cache is greater than a threshold.

In Example 7, the subject matter of claims 1-6 and 8-9 can optionally include that the memory management unit is further to: indicate the data in the second cache line as invalid in response to the write of the modified data in the first cache line to the third cache line.

In Example 8, the subject matter of claims 1-7 and 9 can optionally include that the apparatus comprises a processing unit including at least one processing core, wherein each of the at least one processing core includes an instance of the first level cache, wherein the second level cache comprises a last level cache in a memory device external to the at least one processing core in the processing unit, and wherein the third level cache comprises a main memory for the processing unit.

In Example 9, the subject matter of claims 1-8 can optionally include that the second level cache is implemented in a spin-transfer torque magnetic random-access memory (STT-RAM).

Example 10 is a system, comprising: a first level cache; a second level cache; a third level cache; a memory management unit to: process a first cache line in the first level cache having modified data for an address, wherein each cache line of cache lines in the first level cache stores data for one of a plurality of addresses stored in multiple cache lines of the second level cache; select a second cache line in the second level cache; determine a number of corresponding bits in the first cache line and the second cache line that are different; and write bits in the first cache line that are different from the corresponding bits in the second cache line to the corresponding bits in the second cache line in response to a determination that the number of corresponding bits that are different is less than a threshold.

In Example 11, the subject matter of claims 10 and 12-15 can optionally include that to write the bits that are different is to perform a partial write operation to only write bits in the first cache line that differ from the corresponding bits in the second cache line.

In Example 12, the subject matter of claims 10, 11 and 13-15 can optionally include that to select the second cache line is to determine a cache line in the second level cache having outdated data for the address of the modified data.

In Example 13, the subject matter of claims 10-12 and 14-15 can optionally include that the first cache line in the first level cache is processed to evict data for the first cache line from the first level cache in order to use the first cache line to store data for another address.

In Example 14, the subject matter of claims 10-13 and 15 can optionally include that to determine the number of corresponding bits in the first and the second cache lines that differ is to perform an XOR operation of the corresponding bits in the first and second cache lines.

In Example 15, the subject matter of claims 10-14 can optionally include that each cache line of cache lines in the second level cache stores data for one of a plurality of addresses stored in multiple cache lines of a third level cache, wherein the memory management unit is further to: write the modified data for the address in the first cache line to a third cache line in the third level cache in response to a determination that the number of corresponding bits that are different between the first cache line in the first level cache and the second cache line in the second level cache is greater than a threshold.

Example 16 is an integrated circuit die in communication with a last level cache, comprising: a plurality of processing cores, each processing core including a first level cache and a memory management unit; and a second level cache, wherein the memory management unit in each processing core of the processing cores is to: process a first cache line in the first level cache, in the processing core having the memory management unit, having modified data for an address, wherein each cache line of cache lines in the first level cache stores data for one of a plurality of addresses stored in multiple cache lines of the second level cache; select a second cache line in the second level cache; determine a number of corresponding bits in the first cache line and the second cache line that are different; and write bits in the first cache line that are different from the corresponding bits in the second cache line to the corresponding bits in the second cache line in response to a determination that the number of corresponding bits that are different is less than a threshold.

In Example 17, the subject matter of claims 16 and 18 can optionally include to be in communication with a third level cache in a memory device, wherein each cache line of cache lines in the second level cache stores data for one of a plurality of addresses stored in multiple cache lines of a third level cache, wherein the memory management unit in each of the processing cores is further to is further to: write the modified data for the address in the first cache line in the processing core having the memory management unit to a third cache line in the third level cache in response to a determination that the number of corresponding bits that are different between the first cache line in the first level cache and the second cache line in the second level cache is greater than a threshold.

In Example 18, the subject matter of claims 16 and 17 can optionally include that the second level cache is implemented in the integrated circuit die.

Example 19 is a method for caching data in a hierarchy of caches, comprising: processing a first cache line in a first level cache having modified data for an address, wherein each cache line of cache lines in the first level cache stores data for one of a plurality of addresses stored in multiple cache lines of a second level cache; selecting a second cache line in the second level cache; determining a number of corresponding bits in the first cache line and the second cache line that are different; and writing bits in the first cache line that are different from the corresponding bits in the second cache line to the corresponding bits in the second cache line in response to a determination that the number of corresponding bits that are different is less than a threshold.

In Example 20, the subject matter of claims 19 and 21-25 can optionally include that the writing the bits that are different is to perform a partial write operation to only write bits in the first cache line that differ from the corresponding bits in the second cache line.

In Example 21, the subject matter of claims 19, 20 and 22-25 can optionally include that the selecting the second cache line is to determine a cache line in the second level cache having outdated data for the address of the modified data.

In Example 22, the subject matter of claims 19-21 and 23-25 can optionally include that the first cache line in the first level cache is processed to evict data for the first cache line from the first level cache in order to use the first cache line to store data for another address.

In Example 23, the subject matter of claims 19-21 and 24-25 can optionally include that the determining the number of corresponding bits in the first and the second cache lines that differ performs an XOR operation of the corresponding bits in the first and second cache lines.

In Example 24, the subject matter of claims 19-23 and 25 can optionally include that each cache line of cache lines in the second level cache stores data for one of a plurality of addresses stored in multiple cache lines of a third level cache, further comprising: writing the modified data for the address in the first cache line to a third cache line in the third level cache in response to a determination that the number of corresponding bits that are different between the first cache line in the first level cache and the second cache line in the second level cache is greater than a threshold.

In Example 25, the subject matter of claims 19-24 can optionally include indicating the data in the second cache line as invalid in response writing the modified data in the first cache line to the third cache line.

Example 26 is an apparatus for caching data in a hierarchy of caches, comprising: means for processing a first cache line in a first level cache having modified data for an address, wherein each cache line of cache lines in the first level cache stores data for one of a plurality of addresses stored in multiple cache lines of a second level cache; means for selecting a second cache line in the second level cache; means for determining a number of corresponding bits in the first cache line and the second cache line that are different; and means for writing bits in the first cache line that are different from the corresponding bits in the second cache line to the corresponding bits in the second cache line in response to a determination that the number of corresponding bits that are different is less than a threshold.

Example 27 is a machine-readable storage including machine-readable instructions, when executed, to implement a method or realize an apparatus as claimed in any preceding claim.

Example 28 is an apparatus comprising means to perform a method as claimed in any preceding claim.

What is claimed:

1. An apparatus for caching data in a first level cache and a second level cache in a hierarchy of caches, comprising:
    a memory management unit to:
        process a first cache line in the first level cache having modified data for an address, wherein each cache line of cache lines in the first level cache stores data for one of a plurality of addresses stored in multiple cache lines of the second level cache;
        select a second cache line in the second level cache;
        determine a number of corresponding bits in the first cache line and the second cache line that are different; and
        write bits in the first cache line that are different from the corresponding bits in the second cache line to the corresponding bits in the second cache line in response to a determination that the number of corresponding bits that are different is less than a threshold.

2. The apparatus of claim 1, wherein to write the bits that are different is to perform a partial write operation to only write bits in the first cache line that differ from the corresponding bits in the second cache line.

3. The apparatus of claim 1, wherein to select the second cache line is to determine a cache line in the second level cache having outdated data for the address of the modified data.

4. The apparatus of claim 1, wherein the first cache line in the first level cache is processed to evict data for the first cache line from the first level cache in order to use the first cache line to store data for another address.

5. The apparatus of claim 1, wherein to determine the number of corresponding bits in the first and the second cache lines that differ is to perform an XOR operation of the corresponding bits in the first and second cache lines.

6. The apparatus of claim 1, wherein the second level cache is implemented in a spin-transfer torque magnetic random-access memory (STT-RAM).

7. The apparatus of claim 1, wherein each cache line of cache lines in the second level cache stores data for one of a plurality of addresses stored in multiple cache lines of a third level cache, wherein the memory management unit is further to:
    write the modified data for the address in the first cache line to a third cache line in the third level cache in response to a determination that the number of corresponding bits that are different between the first cache line in the first level cache and the second cache line in the second level cache is greater than a threshold.

8. The apparatus of claim 7, wherein the memory management unit is further to:
indicate the data in the second cache line as invalid in response to the write of the modified data in the first cache line to the third cache line.

9. The apparatus of claim 7, wherein the apparatus comprises a processing unit including at least one processing core, wherein each of the at least one processing core includes an instance of the first level cache, wherein the second level cache comprises a last level cache in a memory device external to the at least one processing core in the processing unit, and wherein the third level cache comprises a main memory for the processing unit.

10. A system, comprising:
a first level cache;
a second level cache;
a third level cache;
a memory management unit to:
process a first cache line in the first level cache having modified data for an address, wherein each cache line of cache lines in the first level cache stores data for one of a plurality of addresses stored in multiple cache lines of the second level cache;
select a second cache line in the second level cache;
determine a number of corresponding bits in the first cache line and the second cache line that are different; and
write bits in the first cache line that are different from the corresponding bits in the second cache line to the corresponding bits in the second cache line in response to a determination that the number of corresponding bits that are different is less than a threshold.

11. The system of claim 10, wherein to write the bits that are different is to perform a partial write operation to only write bits in the first cache line that differ from the corresponding bits in the second cache line.

12. The system of claim 10, wherein to select the second cache line is to determine a cache line in the second level cache having outdated data for the address of the modified data.

13. The system of claim 10, wherein the first cache line in the first level cache is processed to evict data for the first cache line from the first level cache in order to use the first cache line to store data for another address.

14. The system of claim 10, wherein to determine the number of corresponding bits in the first and the second cache lines that differ is to perform an XOR operation of the corresponding bits in the first and second cache lines.

15. The system of claim 10, wherein each cache line of cache lines in the second level cache stores data for one of a plurality of addresses stored in multiple cache lines of a third level cache, wherein the memory management unit is further to:
write the modified data for the address in the first cache line to a third cache line in the third level cache in response to a determination that the number of corresponding bits that are different between the first cache line in the first level cache and the second cache line in the second level cache is greater than a threshold.

16. An integrated circuit die in communication with a last level cache, comprising:
a plurality of processing cores, each processing core including a first level cache and a memory management unit; and
a second level cache,
wherein the memory management unit in each processing core of the processing cores is to:
process a first cache line in the first level cache, in the processing core having the memory management unit, having modified data for an address, wherein each cache line of cache lines in the first level cache stores data for one of a plurality of addresses stored in multiple cache lines of the second level cache;
select a second cache line in the second level cache;
determine a number of corresponding bits in the first cache line and the second cache line that are different; and
write bits in the first cache line that are different from the corresponding bits in the second cache line to the corresponding bits in the second cache line in response to a determination that the number of corresponding bits that are different is less than a threshold.

17. The integrated circuit die of claim 16, further in communication with a third level cache in a memory device, wherein each cache line of cache lines in the second level cache stores data for one of a plurality of addresses stored in multiple cache lines of a third level cache, wherein the memory management unit in each of the processing cores is further to is further to:
write the modified data for the address in the first cache line in the processing core having the memory management unit to a third cache line in the third level cache in response to a determination that the number of corresponding bits that are different between the first cache line in the first level cache and the second cache line in the second level cache is greater than a threshold.

18. The integrated circuit die of claim 16, wherein the second level cache is implemented in the integrated circuit die.

19. A method for caching data in a hierarchy of caches, comprising:
processing a first cache line in a first level cache having modified data for an address, wherein each cache line of cache lines in the first level cache stores data for one of a plurality of addresses stored in multiple cache lines of a second level cache;
selecting a second cache line in the second level cache;
determining a number of corresponding bits in the first cache line and the second cache line that are different; and
writing bits in the first cache line that are different from the corresponding bits in the second cache line to the corresponding bits in the second cache line in response to a determination that the number of corresponding bits that are different is less than a threshold.

20. The method of claim 19, wherein the writing the bits that are different is to perform a partial write operation to only write bits in the first cache line that differ from the corresponding bits in the second cache line.

21. The method of claim 19, wherein the selecting the second cache line is to determine a cache line in the second level cache having outdated data for the address of the modified data.

22. The method of claim 19, wherein the first cache line in the first level cache is processed to evict data for the first cache line from the first level cache in order to use the first cache line to store data for another address.

23. The method of claim 19, wherein the determining the number of corresponding bits in the first and the second cache lines that differ performs an XOR operation of the corresponding bits in the first and second cache lines.

24. The method of claim 19, wherein each cache line of cache lines in the second level cache stores data for one of a plurality of addresses stored in multiple cache lines of a third level cache, further comprising:
- writing the modified data for the address in the first cache line to a third cache line in the third level cache in response to a determination that the number of corresponding bits that are different between the first cache line in the first level cache and the second cache line in the second level cache is greater than a threshold.

25. The method of claim 24, further comprising:
- indicating the data in the second cache line as invalid in response writing the modified data in the first cache line to the third cache line.

* * * * *